(12) United States Patent
Gold et al.

(10) Patent No.: US 9,880,906 B2
(45) Date of Patent: Jan. 30, 2018

(54) DRIVE RESOURCES IN STORAGE LIBRARY BEHIND VIRTUAL LIBRARY

(75) Inventors: Stephen Gold, Fort Collins, CO (US); Shannon Moyes Clark, Fort Collins, CO (US)

(73) Assignee: Hewlett Packard Enterprise Development LP, Houston, TX (US)

(*) Notice: Subject to any disclaimer, the term of this patent is extended or adjusted under 35 U.S.C. 154(b) by 2240 days.

(21) Appl. No.: 11/769,485

(22) Filed: Jun. 27, 2007

(65) Prior Publication Data
US 2009/0006733 A1 Jan. 1, 2009

(51) Int. Cl.
*G06F 11/14* (2006.01)
*G06F 3/06* (2006.01)

(52) U.S. Cl.
CPC .......... *G06F 11/1461* (2013.01); *G06F 3/065* (2013.01); *G06F 3/0611* (2013.01); *G06F 3/0617* (2013.01); *G06F 3/0686* (2013.01); *G06F 11/1456* (2013.01); *G06F 11/1464* (2013.01)

(58) Field of Classification Search
CPC ...... G06F 3/0686; G06F 3/061; G06F 3/0631; G06F 3/0673; G06F 3/0644
See application file for complete search history.

(56) References Cited

U.S. PATENT DOCUMENTS

| 4,707,693 | A  | * | 11/1987 | Hessel | 370/414 |
|-----------|----|----|---------|--------|---------|
| 7,263,596 | B1 | * | 8/2007 | Wideman et al. | 711/209 |
| 2002/0120662 | A1 | * | 8/2002 | Goiffon | 709/102 |
| 2003/0014568 | A1 | * | 1/2003 | Kishi et al. | 710/4 |
| 2003/0050729 | A1 | * | 3/2003 | Basham et al. | 700/214 |
| 2003/0188233 | A1 | * | 10/2003 | Lubbers et al. | 714/100 |

* cited by examiner

*Primary Examiner* — Reginald Bragdon
*Assistant Examiner* — Thanh Vo
(74) *Attorney, Agent, or Firm* — Law office of Philip Scott Lyren

(57) ABSTRACT

Embodiments include methods, apparatus, and systems for managing resources in a physical storage library behind a virtual storage library. In one embodiment, priorities are assigned to copy applications and rules determine which when applications are assigned to resources in the physical storage library.

17 Claims, 4 Drawing Sheets

DRIVE RESOURCES IN STORAGE LIBRARY BEHIND VIRTUAL LIBRARY

BACKGROUND

A virtual tape storage system (also referred to as a virtual tape library) is used to emulate an actual tape storage system. Many virtual tape storage systems are implemented as disk-based systems that contain virtual tape devices (implemented with disk-based devices) for emulating physical tape devices of the actual tape storage system.

A tape storage system is typically used for performing backup of data contained in various systems, such as application servers. However, tape storage systems are typically relatively slow, such that if the amount of data that has to be backed up is very large, then performing backups to tape storage systems becomes impractical. The use of virtual tape storage systems, containing disk-based devices, allows backup operations to complete in shorter amounts of time, since disk-based devices have higher access speeds than tape-based devices.

Virtual tape storage systems are associated with various issues. For example, each different application that requires tape resources also needs its own dedicated tape drive or even its own dedicated tape library. Thus sharing physical resources in a tape library can be difficult because a tape drive can only be used for one application at a time. This limited use of tape drives leads to inefficient use of tape drive resources. Drives reserved for one application can be idle while another application is unable to run because no drives are available.

DETAILED DESCRIPTION

Figure 1:
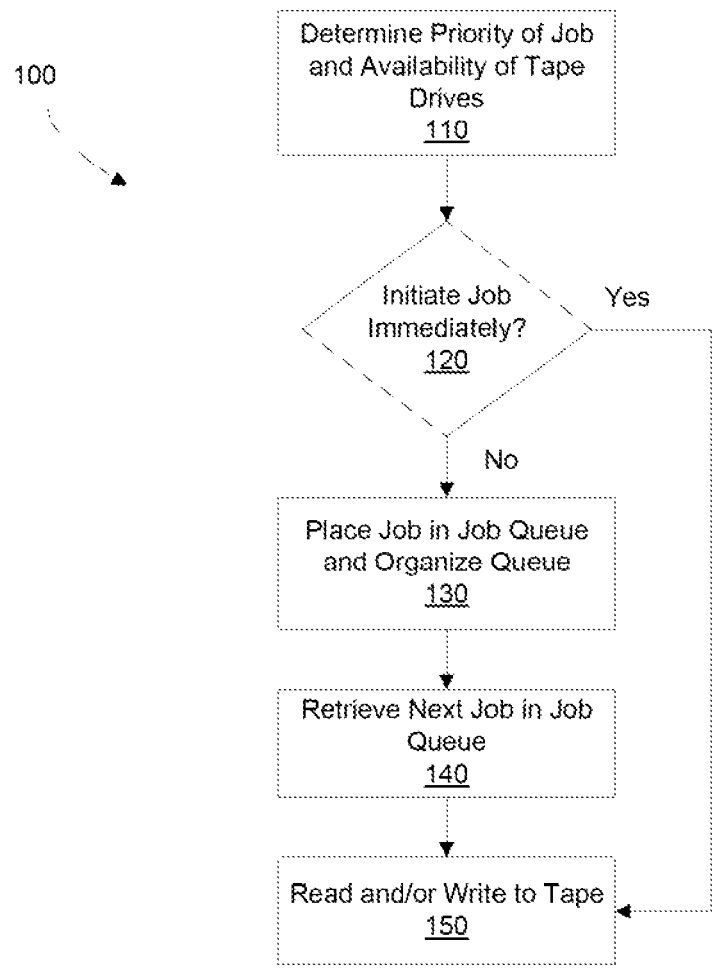
FIG. 1 is a flow chart of allocating drive resources in a physical storage library behind a virtual storage library according to an exemplary embodiment.

Embodiments in accordance with the present invention are directed to apparatus, systems, and methods for managing drive resources in a physical tape library that is embedded behind a virtual tape library. One embodiment balances tape drive resources across various different internal copy applications that include, but are not limited to, mirroring virtual to physical cartridges, copying tapes or pieces of tapes under backup application control, using tape cartridges for extending the virtual library capacity, etc.

In one exemplary embodiment, every tape drive can be used by every internal copy application with one application at a time reserving the tape drive. Each copy application is prioritized, and a policy-based system controls which applications are assigned to which tape drives. By way of example, a policy engine or policy manager includes a job queue that tracks which tape application is using which tape resources at any time. The policy engine also tracks the type of job executing on each tape drive and coordinates all the various tape applications to maximize efficient use of the tape resources at all times.

In one exemplary embodiment, the policy engine assigns relative priorities to each type of tape job. Priorities can vary according to user-defined policy rules. By way of example, five different priorities for tape jobs are assigned as follows:
  (1) Priority1 (highest): Externally triggered tape copy jobs. These jobs are given highest priority because the external application knows nothing about any other internal jobs inside the virtual library and expects its job to be done as soon as possible.
  (2) Priority2: Tape scan jobs (the header is read from a new tape loaded into the physical library so that the tape applications can then use it for copy operations).
  (3) Priority3: User-initiated restores (copying data from physical tape back to virtual tape to allow user to restore data).
  (4) Priority4: Internal mirror copy jobs triggered by a backup application ejecting a virtual cartridge.
  (5) Priority5 (lowest): Internal mirror copy jobs triggered by a copy window scheduler.

User-defined policy rules are applied to allow the policy engine to decide which job is assigned to which physical tape drive. The policy engine can also cancel running lower priority jobs in favor of higher priority jobs. For instance, if a tape drive is initiating an internal mirror copy job having priority 4, then this copy job can be halted and replaced with an externally triggered tape copy job having priority 1. The internal mirror copy job is re-initiated after completion of the externally triggered tape copy job (assuming another job of higher priority is not queued).

The policy rules can also define limits on cancelling or re-prioritizing tape jobs. For example, the externally triggered copy jobs (controlled via storage management initiative specification, SMI-S) can define a maximum number of copy operations to be allowed on each virtual/physical library mapping (for instance, the maximum is the number of tape drives in the physical library). The rules would then limit how many higher priority externally triggered copy jobs could run at any one time. By way of example, if the user defines that all the physical tape resources assigned to a virtual library can be used for the higher priority copy jobs, then mirror jobs will only run when externally triggered copy jobs are not running. However, if the policy limit is defined to be less than the number of available physical drives, then any mirror operations can be running concurrently with the externally triggered copy jobs. For example, a lower priority mirror copy operation might be using a physical drive when a higher priority externally triggered copy is started. The policy engine determines whether any tape drive is available in the required physical library. If a free drive exists, it is assigned to the new job. But if all the drives are busy, and if the maximum number of externally triggered copy operations has not been exceeded for that physical library, then the policy manager cancels one of the running mirror jobs (because they are lower priority) and then re-assigns the tape drive to the higher priority job.

The external backup application triggers copy jobs via SMI-S and starts a certain number of jobs (the maximum number of externally triggered copy operations for that destination physical library mapped to a virtual library) that will definitely run quickly regardless of what else is running inside the virtual library. In one embodiment, each copy job is assigned to a physical tape drive when the job commences. In other words, copy jobs are not assigned until the job commences. Lower priority jobs run when higher priority jobs are idle since drives are not reserved (and thus idle) for particular copy jobs.

In one embodiment, if one tape drive fails, then all of the other tape drives are still available to all of the copy applications. In other words, after a drive failure, all applications can still make the most efficient use of the tape drive resources.

In one embodiment, the virtual tape library includes multiple controllers. The policy engine load-balances the copy traffic not only across the physical tape drive resources but also across the virtual tape controller resources. So if one virtual tape controller fails, its copy jobs are restarted on another controller.

In exemplary embodiments, resources of the physical tape drive are efficiently shared across multiple contending copy applications inside the virtual library without having to create separate pools of tape drives that are reserved for each application. This means that each application can have access to all of the available tape drives if there is no contention (example, each application runs at different times). If there is contention between applications, then the resources are efficiently balanced across the applications based on priority policies and throttling policies.

In one embodiment, a tape drive failure affects all applications equally at a lower level rather than having a much higher impact on one specific application. Further, additional copy applications can be added later without interfering with existing applications. For example, the SMI-S application program interface (API) enables backup applications to externally trigger copy operations inside the virtual library so that the destination library is only presented as a pool of tapes. In this example, the physical library resources are abstracted from external control.

FIG. 1 is a flow chart 100 of allocating drive resources in a physical storage library behind a virtual storage library according to an exemplary embodiment.

According to block 110, a determination is made of the priority of an incoming job and the availability of tape drives. Jobs are assigned priorities according to user-defined policy rules that are executed by the policy engine. Jobs are classified to according to one of two of more hierarchical priorities or rankings that specify when jobs are initiated and canceled. For instance, if six different priorities exist, then an incoming job is assigned to one of the six priorities.

The status or availability of the tape drives is also determined. By way of example, tape drives can have a status of failed, available for job, or unavailable (example, busy processing another tape job).

According to block 120, question is asked as to whether the incoming job is initiated immediately. The priority of the incoming job is compared against the pending jobs in the queue and the jobs currently being initiated in the tape drives. If the incoming job has the highest priority of all pending jobs in the queue and a tape drive is available, then flow proceeds to block 150 and the incoming job is initiated immediately. For instance, data is written to or read from a tape in a tape library to initiate the incoming job.

If the incoming job is not initiated immediately, then flow proceeds to block 130 wherein the job is placed in the job queue according to its priority and the job queue is organized. In one embodiment, the job queue is arranged according to the priorities assigned to the jobs in block 110. Jobs with higher priorities are placed in the job queue and executed before jobs with lower priorities. For example, assume a job queue has pending jobs of priorities one, three and four. An incoming job of priority two is placed ahead of priorities three and four but behind the job having priority one.

According to block 140, the next job in the job queue is retrieved. The jobs are retrieved and executed according the user-defined policy rules. In one embodiment, executing a job includes reading from and/or writing to a magnetic tape in a tape library as shown in block 150.

Figure 2:
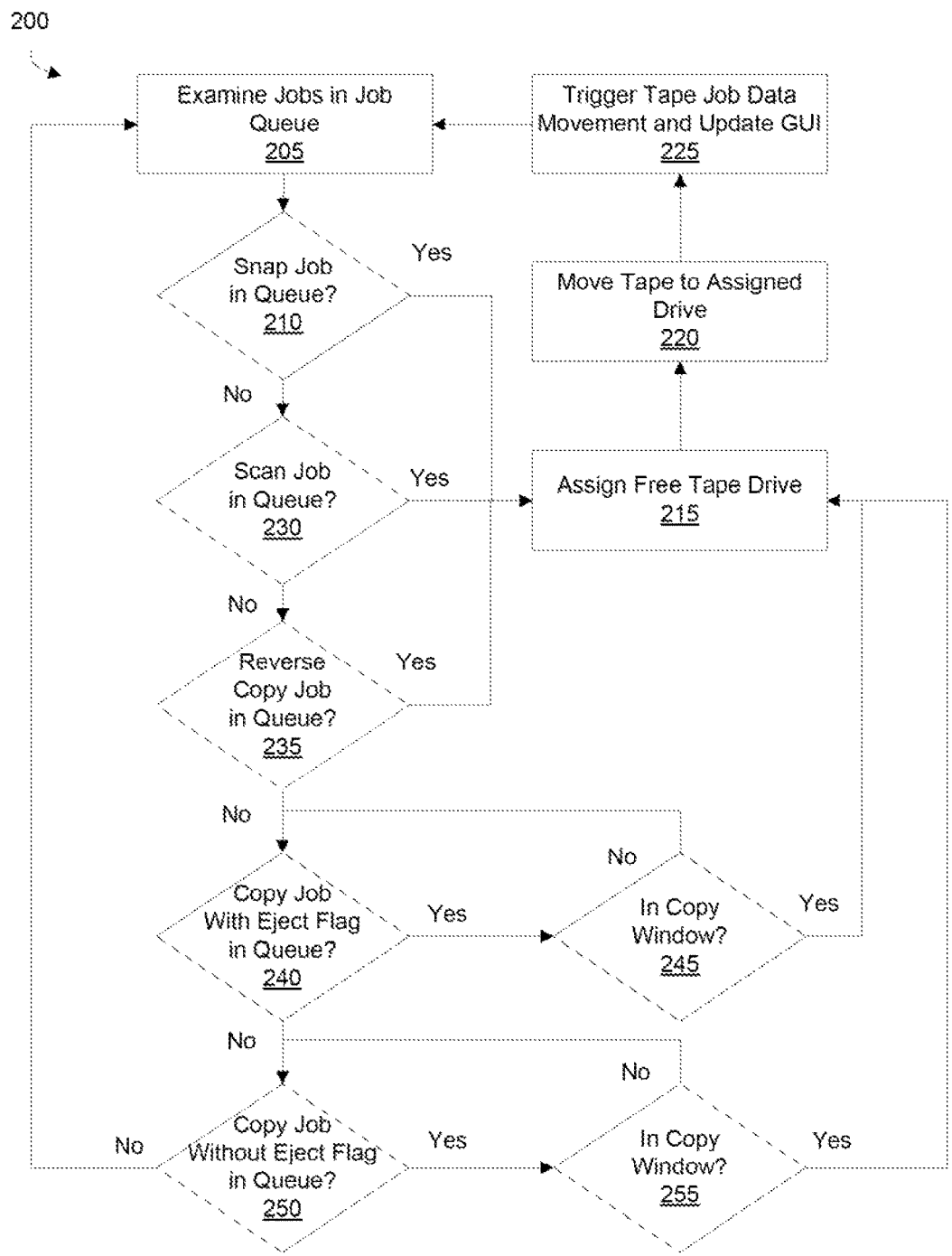
FIG. 2 is a flow diagram for prioritizing and executing jobs according to an exemplary embodiment.

FIG. 2 is a flow diagram 200 for prioritizing and executing jobs according to an exemplary embodiment. The specific priority of jobs is provided as an example to illustrate an embodiment. Other priorities are also within exemplary embodiments and include different number of jobs and/or different priorities assigned to particular jobs.

According to block 205, jobs in the job queue are examined. Each job created in the queue has attributes that define the job type (example, scan, mirror copy to tape, reverse mirror copy, snap copy), the target physical tape and matching/source virtual tape, and the target physical tape library. The mirror copy to tape jobs also have the Tape Copy Schedule attributes and an optional eject flag. The snap copy jobs have no schedule times (since they are immediate jobs), and they include tape header data for the destination tape. Any new job created is added to the end of the queue (so jobs are processed on a first-in-first-out, FIFO, basis). The method regularly or periodically (example, once per minute) reviews the job queue, and processes the jobs in the queue in priority order.

In one embodiment, the method first examines the job queue for pending tape snapshot jobs which have the highest priority. According to block 210, if a snap job exists in the queue, then flow proceeds to block 215 wherein a tape drive is assigned to the snap job. If a snap job is not in the queue, then flow proceeds to block 230.

In block 230, the method examines the job queue for pending scan jobs which have the next highest priority. If a scan job exists in the queue, then flow proceeds to block 215 wherein a tape drive is assigned to the scan job. If a scan job is not in the queue, then flow proceeds to block 235.

In block 235, the method examines the job queue for pending reverse copy jobs which have the next highest priority. If a reverse copy job exists in the queue, then flow proceeds to block 215 wherein a tape drive is assigned to the reverse copy job. If a reverse copy job is not in the queue, then flow proceeds to block 240.

In block 240, the method examines the job queue for a copy job with an eject flag which has the next highest priority. If a copy job with an eject flag exists in the queue, then flow proceeds to block 245 wherein a determination is made as to whether it is in the copy window. If the answer to this question is "yes" then flow proceeds to block 215 wherein a tape drive is assigned to the copy job with an eject flag. If the answer to this question is "no" then flow proceeds back block 240. If no copy job with an eject flag exists in the job queue, then flow proceeds to block 250.

In block 250, the method examines the job queue for a copy job without an eject flag which has the lowest priority. If a copy job without an eject flag exists in the queue, then flow proceeds to block 255 wherein a determination is made as to whether it is in the copy window. If the answer to this question is "yes" then flow proceeds to block 215 wherein a tape drive is assigned to the copy job without an eject flag. If the answer to this question is "no" then flow proceeds back block 250. If no copy job without an eject flag exists in the job queue, then flow proceeds to back to block 205.

The method thus checks for pending scan jobs, then for pending reverse copy jobs, then pending copy to tape jobs with the eject flag set, then finally the lowest priority jobs which are the pending copy to tape jobs without eject flag set. Active jobs are ignored since they are already running.

When the highest priority pending job is found, it is processed immediately if the pending job is a snapshot copy or scan or reverse copy job. If this is a pending tape mirror copy job (with or without the eject flag) then the method checks if the current time is within the Tape Copy Schedule attribute (Start Time and End Time) on the job. If so, then the method processes the job; otherwise the job is skipped and the next highest priority pending job is checked, etc.

When a job is processed, the policy manager first attempts to reserve a free drive in the target physical tape library needed to run the job. The user can drive limits for snapshot copy pools (thus allowing them to ensure some minimum level of service for these externally triggered jobs). If there are no free drives available in the target library, then the method cancels a running lower priority tape job in favor of a snapshot copy job if the drive limit is not exceeded for that target library/pool. If there are no cancellable jobs and no free drives for this review cycle, the method continues reviewing the remainder of the queue in priority order but skipping all jobs targeted at the busy library. This ensures that jobs targeted at libraries that have free drives are still processed in this cycle. The next review cycle attempts to process pending jobs for all target libraries again (in case the busy library now has a free drive). An Assign Free Tape Drive process keeps track of the currently used tape drives in all the physical libraries, so when a drive is assigned to a new job it is marked as busy so that other jobs cannot use it until the job using it is complete.

According to block 220, the tape is moved to the assigned drive. In one embodiment, after assigning a drive to the new job, the method then moves (via the data movement agent) the physical tape from its slot to the assigned tape drive.

According to block 225, tap job data movement is triggered, and the graphical user interface (GUI) is updated. Once the tape has been successfully loaded into the drive, the method then triggers the data movement agent to perform the required data transfer for that job (example read the header if this is a scan, copy the virtual tape to the physical tape for a copy job, copy the physical tape to the virtual tape for a reserve copy). After successfully triggering the data transfer, the method sets the job status in the queue to active and updates the GUI to set the status on the physical tape to "Copying" or "Restoring" or "Scanning" depending on the job type. In multi-node environments, the method also determines which node's data movement agent will perform the job (any one of them can do this since every node can see all physical libraries and all virtual cartridges), which will be based on balancing the copy performance across the available nodes.

After triggering the data transfer, the method then returns to reviewing the queue from the top to find and process the next highest priority pending job (as shown in block 205).

Figure 3:
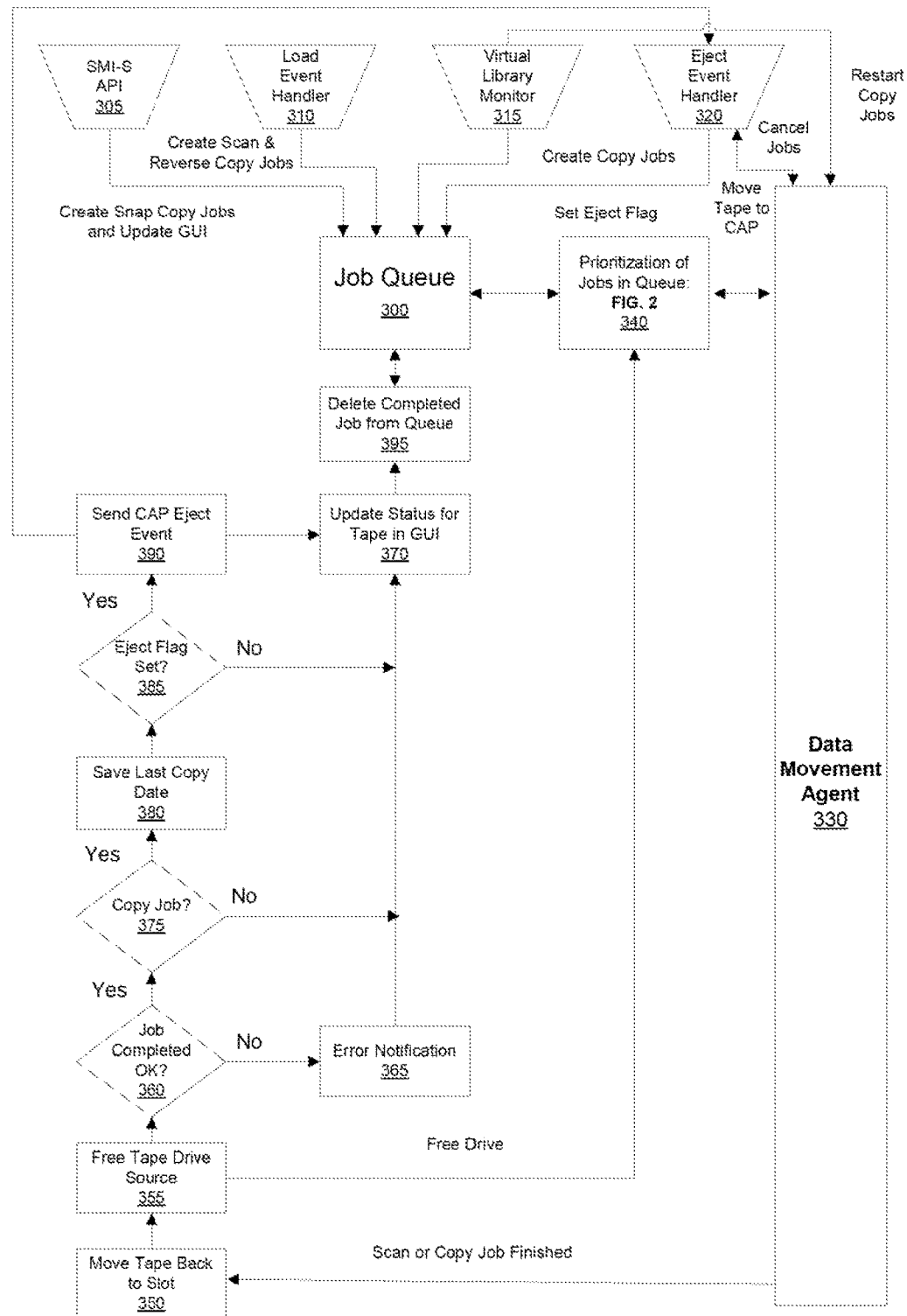
FIG. 3 is another flow diagram for prioritizing and executing jobs according to an exemplary embodiment.

FIG. 3 is another flow diagram for prioritizing and executing jobs according to an exemplary embodiment. A job queue 300 is coupled to a plurality of processes, namely SMI-S API 305, load event handler 310, virtual library monitor 315, and eject event handler 320. The flow diagram shows the job queue, where the jobs are created, processed, and their results acted on.

Briefly, the processes function as follows: The SMI-S API 305 allows an external application to generate a snap copy job and updates the GUI. The load event handler 310 generates scan jobs (to get the header for new tapes) and generates reverse copy jobs to do a restore preparation. The virtual library monitor 315 generates mirror copy jobs when it detects a mirrored virtual cartridge has been modified compared to the last time it was copied to physical tape. The virtual library monitor also triggers a job restart directly to the data movement agent if it detects a virtual tape was modified while it is being actively copied. The eject event handler 320 modifies an existing pending mirror copy job to set the eject flag if the user has ejected the matching virtual tape from the library via the backup application. This action indicates a deferred eject when the copy is complete. The eject handler also cancels active jobs for a manually ejected tape and triggers a move of a tape to the cartridge access panel (CAP) via the data movement agent if it is able to process a CAP eject because the tape is ready for eject (fully synchronized).

As shown, the data movement agent 330 is coupled to the virtual library monitor 315 (sending restart copy jobs) and to the eject event handler 320 (sending cancel jobs and move tape to CAP). The data movement agent 330 also couples to block 340 which represents the flow diagram of FIG. 2 (example, blocks 220 (moving tape to an assigned drive) and block 225 (triggering tape job date movement and updating the GUI)).

When a scan or copy job is finished, the data movement agent 330 provides notice to move the tape back to the slot, block 350. Moving the tape frees the tape drive source, block 355. This tape drive is now available to be assigned (see block 215 of FIG. 2). According to block 360, a determination is made as to whether the job successfully completed. If the job did not complete, then an error notification is provided according to block 365 and an update of the status of the tape is provided in the GUI according to block 370. Next at block 375 a determination is made as to whether the job is a copy job. If the job is not a copy job, then flow proceeds to block 370. If the job is a copy job, then flow proceeds to block 380 and the last copy date is saved. Next a determination is made as to whether the eject flag is set according to block 385. If the eject flag is not set then flow proceeds to block 370. If the eject flag is set, then flow proceeds to 390 and the CAP eject event is sent. After the status for the tape is updated in the GUI, flow proceeds to block 395 wherein the completed job is deleted from the job queue.

Figure 4:
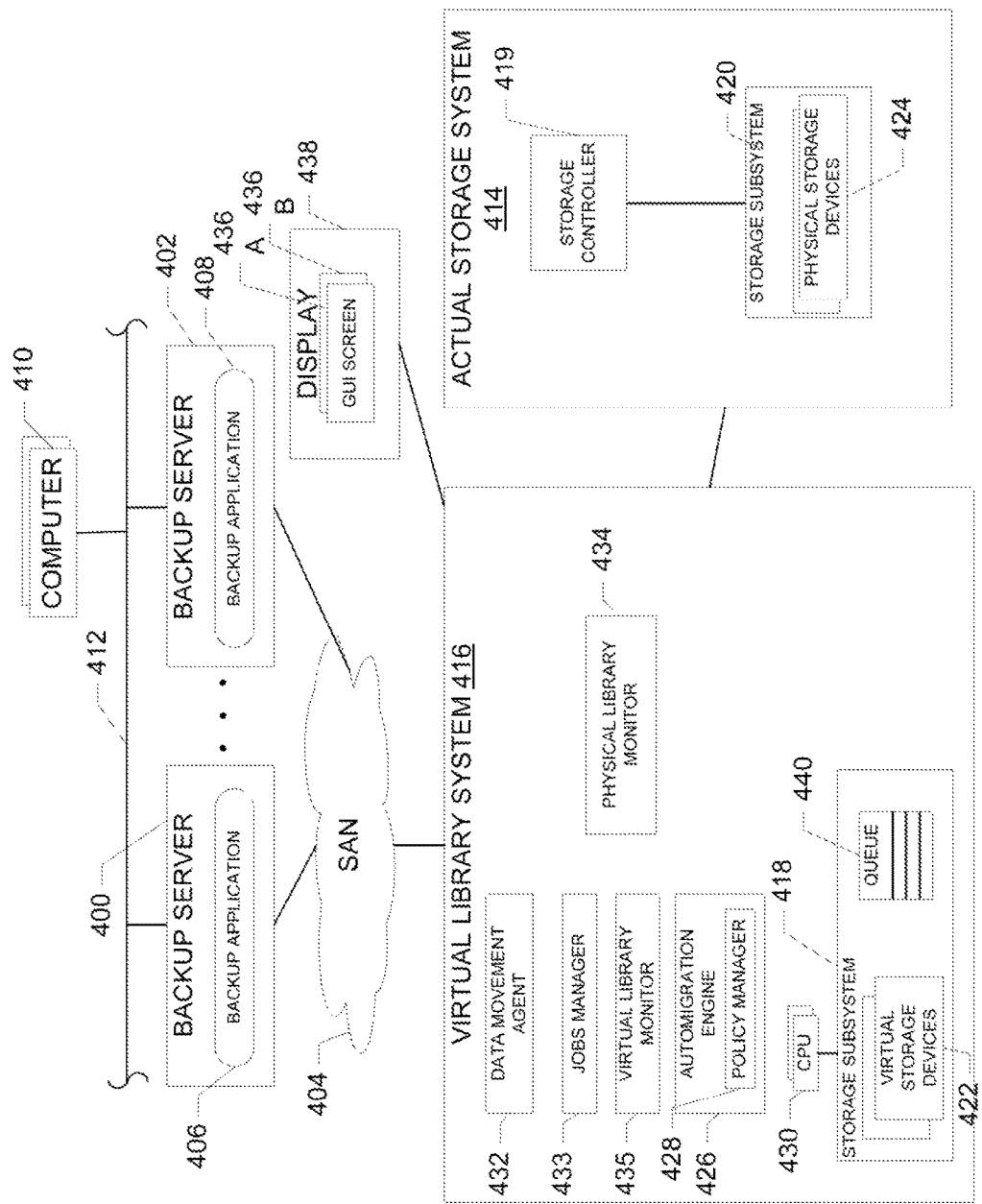
FIG. 4 illustrates an example arrangement of backup servers, a virtual library system, and an actual storage system according to an exemplary embodiment.

Exemplary embodiments can be implemented in a variety of embodiments. By way of example, FIG. 4 illustrates an example arrangement that includes backup servers 400, 402 coupled to a storage area network (SAN) 404. Each backup server 400, 402 includes a corresponding backup application 406, 408. The backup applications 406, 408 control backup of data from computers 410 on a network 412 (e.g., a local area network, wide area network, the Internet, and so forth). During backup operations, data from the computers 410 (which can be application servers, web servers, and so forth) are copied by the backup servers 400, 402 over the SAN 404 to a library system (virtual library system 416 as depicted in FIG. 4). Data can also be restored from the virtual library system 416 back to the computers 410.

Traditionally, backups are performed to an actual tape storage system (such as actual storage system 414). However, since an actual tape storage system may have slow access speeds, backup operations may take relatively long periods of time. To address the relatively slow speeds of actual tape storage systems, the virtual library system 416 is provided between the storage area network 404 and the actual storage system 414. The virtual library system contains a storage subsystem 418 having storage devices with faster access speeds than physical storage devices 424 (e.g., tape cartridges) of a storage subsystem 420 in the actual storage system 414.

The storage subsystem 418 in the virtual library system 416 provides virtual storage devices 422 for emulating physical storage devices 424 in the storage subsystem 420 of the actual storage system. In one example, the storage subsystem 418 includes disk-based storage devices, while the storage subsystem 420 includes tape-based physical storage devices 424. In this example, the disk-based storage devices of the storage subsystem 418 provide the virtual storage devices 422 for emulating the physical storage devices 424. In this manner, backups performed to the virtual library system 416 from the backup servers 400, 402 are accomplished much more quickly than backups performed directly to the actual storage system 414.

In other implementations, the actual storage system 414 includes other types of storage media. For example, instead of a tape-based storage subsystem, the actual storage system 414 includes a disk-based storage subsystem that has disk-based devices for storing backup data. In this alternative implementation, the virtual library system 416 is designed with a storage subsystem 418 made of faster storage devices (such as faster disk-based storage devices, semiconductor-based storage devices, and so forth). More generally, the virtual library system 416 is provided to improve data read and write speeds when compared to the actual storage system 414 during backup or restore operations.

There are various example use cases of the virtual library system 416. In one implementation, multiple virtual libraries are provided on the virtual library system 416, with each virtual library mapped to a different backup server 400, 402. This is a non-shared arrangement, in which a dedicated non-shared virtual library is allocated for each backup server. By using automigration, a single actual storage system 414 is shared among the multiple virtual libraries provided by the virtual library system 416 (so that multiple actual storage systems 414 do not have to be provided). Alternatively, multiple actual storage systems 414 are provided for mapping to the virtual libraries of the virtual library system 416.

In another use case, multiple backup servers 400, 402 are mapped to a single virtual library provided by the virtual library system 416. Automigration is used to copy data from the virtual library system 416 to one or more actual storage systems 414. Other use cases are also possible in other example implementations.

In some embodiments, a backup application (406, 408) is able to control the copying of data from virtual storage devices 422 in the storage subsystem 418 of the virtual library system 416 to corresponding physical storage devices 424 of the storage subsystem 420 in the actual storage system 414. The copying of the content of virtual storage devices (e.g., virtual tape cartridges) to physical storage devices (e.g., physical tape cartridges) allows for offsite storage or longer term retention of data stored on the physical storage devices 424.

Alternatively, an automigration technique is used to copy data from the virtual storage devices to the actual storage devices. Automigration refers to the virtual library system 416 performing background copying of data on virtual storage devices 422 to corresponding physical storage devices. This background copying (controlled by an automigration engine 426 in the virtual library system 416) is performed transparently to the backup application (406, 408) so that the backup application (406, 408) has no awareness of the resulting physical storage device(s) 424.

In one embodiment, the user-defined policy rules are implemented by a policy manager 428 in the automigration engine 426. The policy manager 428 (in association with other modules described further below) monitors both the virtual library system 416 and actual storage system 414 to detect various status changes to the virtual library system 416 and/or actual storage system 414, where such status changes include load and eject changes of physical or virtual storage devices, and data state changes in the virtual storage devices.

The automigration engine 426, using its policy manager 428, prioritizes, monitors, and processes jobs. The automigration engine 426 and policy manager 428 (along with other software modules and processes described herein) in the virtual library system 416 are executable on one or more central processing units (CPUs) or controllers 430 of the virtual library system 416.

Generally, a data state change on a virtual storage device 422 causes a copy job to be scheduled to copy data from the modified virtual storage device 422 to the corresponding physical storage device 424 in storage subsystem 420. For example, when a backup application (406, 408) completes a backup to a particular virtual storage device (which causes the content of the particular virtual storage device to change), then the automigration engine 426 causes a copy job to be scheduled to copy data on the particular virtual storage device to the corresponding physical storage device.

As further depicted in FIG. 4, the virtual library system 416 includes a data movement agent 432 (which can be implemented as software) for performing data and control access to the actual storage system 414. In response to requests from the automigration engine 426 or a backup application (406, 408), the data movement agent 432 sets up a data transfer between the virtual library system 416 and the actual storage system 414 (such as by reserving a drive, e.g., a tape drive, in the actual storage system) so that a data copy can be performed from a specified virtual storage device 422 to a corresponding physical storage device 424. The copying performed by the data movement agent 432 ensures that the exact format (e.g., tape format) on the virtual storage device 422 is duplicated on the physical storage device 424. Examples of tape format include filemarks, setmarks, tape block size, and so forth. The automigration of data from the virtual library system 416 to the actual storage system 414 can copy an entire virtual storage device 422 to the corresponding physical storage device 424, or copy a specified portion of a virtual storage device 422 to the corresponding physical storage device 424.

The data movement agent 432 also controls the transfer of data in the opposite direction from the actual storage system to the virtual library system 416 (referred to as a reverse copy operation). In this case, the data movement agent 432 ensures that the exact format (e.g., tape format) on the physical storage device is duplicated on the virtual storage device.

A physical library monitor 434 (which can be implemented as software) in the virtual library system 416 monitors the actual storage system 414 for media status changes (such as loading or ejecting of physical storage devices 424 in the actual storage system 414). In one implementation, the physical library monitor 434 continually polls (such as repeatedly at some predetermined time interval) to check for status changes in the actual storage system 414, including (1) opening of a library door (not shown) of the actual storage system 414 to allow manual loading or ejection of physical storage devices, and (2) moving physical storage devices between partitions of the actual storage system 414 using a front display panel (not shown) of the actual storage system 414. The front display panel refers to a graphical user interface (GUI) screen displayed by the actual storage system 414 to allow a user to select control items in the GUI screen to move physical storage devices within the actual storage system 414.

The virtual library system 416 also includes a virtual library monitor 435 for monitoring ejection of a virtual storage device that is either activated by a backup application (406, 408) or by a virtual library GUI screen 436A displayed in a display device 438 associated with the virtual library system 416.

The virtual library system 416 also includes a jobs queue 440, which stores various pending jobs that are to be performed between the virtual library system 416 and the actual storage system 414. In FIG. 4, the jobs queue 440 is depicted as being contained in the storage subsystem 418. However, the jobs queue 440 can be stored on another storage medium in the virtual library system 416. Jobs that can be added to the jobs queue 440 include copy jobs (to copy data from a virtual storage device to a physical storage device), reverse copy jobs (performed during a restore operation to copy data from a physical storage device to a virtual storage device), and scan jobs (to scan header information of physical storage devices). Header information of a storage device (such as a tape or disk) contains various metadata regarding the storage device, such as the media type, media size, and identifier information (e.g., bar code). The jobs in the jobs queue 440 are processed by a jobs manager 433 (which can be implemented as software). Each job in the queue 440 has attributes that define the job type (scan, copy to physical storage device, reverse copy), the target physical storage device and the corresponding virtual storage device, and the target physical library.

The virtual library monitor 435 (which can be implemented as software) generates copy jobs when the virtual library monitor detects a virtual storage device has been modified compared to the last time the virtual storage device was copied to a physical storage device. The virtual library monitor will also trigger a copy job restart if the virtual library monitor detects a virtual storage device has been modified while it is being actively copied.

The actual storage system 414 includes one or more storage controllers 419 coupled to the storage subsystem 420 for controlling operations to the physical storage devices 424.

Instructions of software described above (including the software modules and processes in the virtual library system 416 and backup servers 400, 402 of FIG. 4) are loaded for execution on a processor (such as one or more CPUs). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A virtual storage system, comprising:
    a virtual storage library having virtual storage devices to emulate physical storage devices of a physical storage library; and
    a controller to:
    share tape drive resources in the physical storage library with plural different contending copy applications in the virtual storage library without creating separate pools of tape drives reserved for each of the plural different contending copy applications, and
    use user-defined policy rules to determine which of the plural different contending copy applications in a job queue are assigned to which physical tape drives in the physical storage library,
    wherein the plural different contending copy applications include (1) mirroring virtual storage to physical storage, (2) copying physical tapes in the physical storage library under control of a backup application, and (3) using tape cartridges in the physical storage library to extend storage capacity of the virtual storage library.

2. The virtual storage system of claim 1, wherein the controller is to prioritize the plural different contending copy applications in a queue in the virtual storage library.

3. The virtual storage system of claim 1 wherein the physical storage library includes plural tape drives and each of the plural tape drives can be used on each of the plural different contending copy applications.

4. The virtual storage system of claim 1 further comprising a policy manager to track which of the plural different contending copy applications is using which of plural tape drive resources in the virtual and physical storage libraries.

5. The virtual storage system of claim 1 wherein the controller is further to prioritize externally triggered tape copy jobs higher than tape scan jobs, tape scan jobs higher than user-initiated restores, user-initiated restores higher than internal mirror copy jobs triggered by a backup application, and internal mirror copy jobs triggered by a backup application higher than internal mirror copy jobs triggered by a copy window scheduler.

6. The virtual storage system of claim 1 wherein each of the plural different contending copy applications has access to all available tape drives in the physical storage library.

7. A non-transitory computer readable medium having instructions for causing a computer to execute a method, comprising:
    sharing tape drive resources in a physical storage library with plural different contending copy applications in the virtual storage library without creating separate pools of tape drives reserved for each of the plural different contending copy applications, the virtual storage library having virtual storage devices to emulate physical storage devices of a physical storage library, and
    using user-defined policy rules to determine which of the plural different contending copy applications in a job queue are assigned to which physical tape drives in the physical storage library,
    wherein the plural different contending copy applications include (1) mirroring virtual storage to physical storage, (2) copying physical tapes in the physical storage library under control of a backup application, and (3) using tape cartridges in the physical storage library to extend storage capacity of the virtual storage library.

8. The computer readable medium of claim 7, the method further comprising assigning a higher priority to externally triggered tape copy jobs and tape scan jobs than internal mirror copy jobs.

9. The computer readable medium of claim 7, the method further comprising canceling a running lower priority job in a physical tape drive upon receiving a higher priority job so the higher priority job can execute in the physical tape drive.

10. The computer readable medium of claim 7, the method further comprising limiting how many higher priority externally triggered copy jobs execute at any one time in order to limit how many lower priority copy jobs are canceled by the higher priority externally triggered copy jobs.

11. The computer readable medium of claim 7, the method further comprising waiting to assign each of the plural different copy applications to a physical tape drive until each of the plural different copy applications start so lower priority jobs execute while higher priority jobs are idle.

12. The computer readable medium of claim 7, the method further comprising providing all of the plural different copy applications access to all physical tape drives in the physical storage library.

13. The computer readable medium of claim 7, the method further comprising load balancing copy traffic across tape drive resources in the physical storage library and across plural controllers in the virtual storage library so if one of the plural controllers fails copy jobs are restarted on another of the plural controllers.

14. A method for use with a virtual storage library having virtual storage devices to emulate physical storage devices of a physical storage library, comprising:
    sharing tape drive resources in the physical storage library with plural different contending copy applications in the virtual storage library without creating separate pools of tape drives reserved for each of the plural different contending copy applications, and
    using user-defined policy rules to determine which of the plural different contending copy applications in a job queue are assigned to which physical tape drives in the physical storage library,
    wherein the plural different contending copy applications include (1) mirroring virtual storage to physical storage, (2) copying physical tapes in the physical storage library under control of a backup application, and (3) using tape cartridges in the physical storage library to extend storage capacity of the virtual storage library.

15. The method of claim 14 further comprising, canceling a mirror copy job that is initiating in a physical tape drive in the physical storage library when another copy job with a higher priority is received.

16. The method of claim 14 further comprising, assigning a first priority to tape copy jobs, a second priority to tape scan jobs, and a third priority to user-initiated restore jobs that copy data from a physical tape to a virtual tape.

17. The method of claim 14 further comprising, only assigning a copy job to a physical tape drive once the copy job commences so lower priority copy jobs execute while higher priority copy jobs are idle.

* * * * *